Aug. 16, 1966 A. M. STELLE 3,266,059
PRESTRESSED FLEXIBLE JOINT FOR MECHANICAL
ARMS AND THE LIKE
Filed June 19, 1963

INVENTOR.
ALLEN M. STELLE
BY
AGENT

United States Patent Office 3,266,059
Patented August 16, 1966

3,266,059
PRESTRESSED FLEXIBLE JOINT FOR MECHANICAL ARMS AND THE LIKE
Allen M. Stelle, Calabasas, Calif., assignor to North American Aviation, Inc.
Filed June 19, 1963, Ser. No. 289,076
4 Claims. (Cl. 3—12.3)

The present invention relates to a flexible joint and more particularly to a prestressed flexible joint.

Flexible joints find particular use in articulated mechanical arms which simulate the motions of the human arm and hand. These mechanical arms generally have three independent degrees of freedom of effective translation, three independent degrees of rotation, and an additional degree of freedom to open and close, or otherwise actuate, a mechanical device such as tongs. The degrees of movement duplicate the shoulder, elbow, wrist, and hand motions of the human arm. However, in achieving these motions, the flexible joints in known mechanical arms have become extremely complex and expensive pieces of precision machinery.

Accordingly, it is an object of the invention to provide a new and improved flexible joint.

Another object of the invention is to provide an improved flexible joint that requires a minimum of precision between the integral parts forming the joint.

A further object of the invention is to provide a new and improved flexiblt joint that is prestressed to resist compressive forces.

An additional object of the invention is to provide an improved prestressed flexible joint that is readily displaced.

It is also an object of the invention to provide a flexible joint having an improved actuator arrangement.

Briefly, in accordance with one form of the invention, a new and improved flexible joint is provided which is prestressed to maintain the joint in a first position, and has suitable actuator means associated with the joint so that movement of the actuator means overcomes the prestressed condition and causes displacement of the joint in any desired direction from the first position.

Further objects, features, and the attending advantages may best be understood by reference to the following description read in connection with the accompanying drawing, in which.

Figure 1:
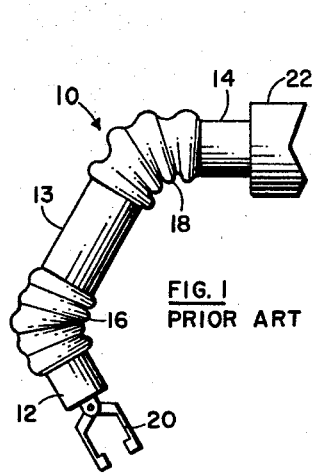
FIGURE 1 is a perspective view of a prior art form of an articulated mechanical arm wherein my invention finds particular use.

Referring now to FIGURE 1, a prior art form of articulated mechanical arm 10 is shown wherein the present invention finds particular use. The arm 10 has rigid, tube sections 12, 13, and 14 spaced apart and connected by suitable intermediate flexible joints 16 and 18. Flexible joints 16 and 18 can be constructed from conventional arrangements such as tapes and pulleys, cables and drums, and the like which are suitably enclosed by the flexible boots that serve primarily as dust seals. Tube stction 12 has a mechanical device, such as tongs 20, associated therewith, while rigid section 14 is connected to a support housing 22. The control tapes, cables, and the like are suitably positioned and connected to the arm 10 to control the arm movement. The arm 10 is displaced by shortening or lengthing the particular control cables so that the flexible joints 16 and 18 are displaced with respect to the rigid sections 12, 13, and 14. In this manner, the tongs 20 can be positioned and actuated in a desired location where work is to be performed.

Figure 2:
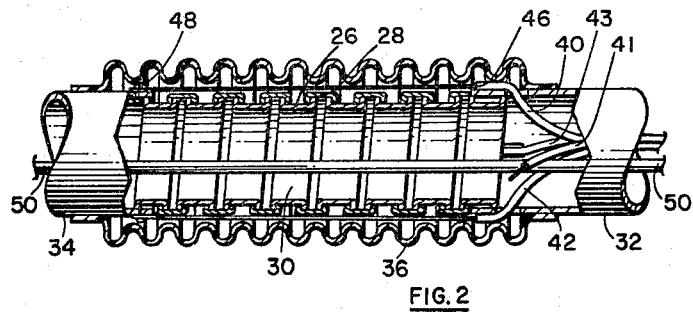
FIGURE 2 is a sectional view, partly broken away, of one form of flexible joint of the invention.

One form of new and improved flexible joint having use in a mechanical arm, such as arm 10 shown by FIGURE 1, is shown by FIGURE 2. The flexible joint is preferably formed from helically wound channel-shaped metal strips 26 and 28 that are wound in opposition as cooperating compression springs into the prestressed tube 30 which resists axially directed compressive forces, but is readily extensible under lateral deflection. The interengaging strips 26 and 28 restrain each other and impart the desired rigidity to the tube 30. This prestressing serves to return the tube 30 to a first or beginning position after extension during lateral deflection. The degree of force necessary to accomplish the flexing and lateral displacement of the tube 30 from the first position may be conveniently controlled by varying, for example, the thickness, width, and cross-section profile of the metal strips 26 and 28; and by varying the amount of spring compression imparted to the metal strips when forming the prestressed tube 30. Rigid tube sections 32 and 34 can be connected to respective ends of the tube 30. A conventional flexible sheath or boot 36 may be attached to the respective tube sections 32 and 34 to exclude dirt and foreign objects from the flexible joint. However, the flexible sheath 36 is not considered critical to the operation of my invention.

Deflection of the flexible joint shown by FIGURE 2 is effected by an actuator means, such as a suitable cable arrangement associated with the joint. Flexible operating cables 40–43, for example sheathed wires or cables, extend through rigid tube section 32 to the region adjacent to the prestressed tube 30. Each one of the cables 40–43 extends generally radially outwardly through suitable apertures in tube section 32. It is preferred, for accurate deflection of the flexible joint in any desired direction from the first position, to circumferentially space the cables 40–43 at approximately 90° intervals about the periphery of the tube 30. While four cables are shown by FIGURE 2, it is contemplated that any number of cables can be suitably positioned to develop a desired deflection. Thus, two cables generally opposed or six cables suitably spaced circumferentially about the flexible joint periphery could, where design parameters permit, accomplish the desired deflection of the particular prestressed flexible joint.

The sheathed wire cables 40–43 can be suitably fixed to the periphery of the rigid section 32, for example, by welding the cable sheath of cable 40 to the section wall at 46. It is contemplated that the cables 40–43 can also be fixed to the periphery of the tube 30. Each wire of the sheathed cables 40–43 extends, as shown by FIGURE 2, from the fixed cable sheath longitudinally along the outer surface of the prestressed tube 30 to the rigid section 34, where the wire ends are fixed to the periphery of section 34, such as wire end 48 of cable 40. While the wires can be skewed circumferentially along the axial length of the prestressed tube 30, it is preferred that each wire extend directly to rigid section 34 while maintaining the same or approximately the same angular spacing as the cable sheaths fixed to rigid section 32.

Additional cable arrangements, similar to cables 40–43 which may be required for related flexible joints or for operation of a desired mechanical device, extend through the central area of the tube 30 and rigid tube sections 32 and 34. One such cable arrangement is shown by FIGURE 2 at 50.

In operation, flexure and the displacement from the first or beginning position of the prestressed flexible joint as shown by FIGURE 2 is accomplished by movement of any one or a desired combination of the sheathed cables 40–43. The degree and direction of displacement is controlled by the selected movement, i.e. shortening or lengthening, of the flexible cable wires. Since related cable arrangements, such as arrangement 50, extend generally through the center of the joint, the displacement motion of one flexible joint will not affect the cable arrangement leading to another flexible joint or to a mechanical device to be actuated. If desired, certain other arrangements may also be carried centrally in a manner similar to the cable arrangement 50, for example, a filament lens system and the like.

Figure 3:
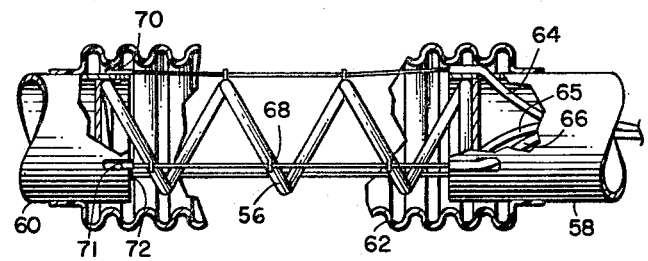
FIGURE 3 is a sectional view, partly broken away, of another form of flexible joint of the invention.

Another form of prestressed flexible joint is shown by FIGURE 3. The flexible joint has a helical spring 56 fixed in compression between rigid tube sections 58 and 60. Since helical spring 56 is in compression, the prestressed flexible joint maintains a first position and will return to this position after each displacement of the joint unless otherwise restrained. The degree of force necessary to accomplish the displacement can be controlled by varying the spring characteristic of helical spring 56. A flexible sheath 62 may be attached to the respective rigid sections 58 and 60 to exclude dirt and foreign objects from the prestressed flexible joint.

The flexible joint shown by FIGURE 3 is displaced from the first position by flexible operating cables 64–66. While three cables have been shown generally positioned at 120° intervals about the joint periphery, any desired number of cables may be used as best determined by actual operating requirements. Each of the cables 64–66 passes from the center of the rigid section 58 and extends along the outer surface of the joint through similar guide rings, such as guide ring 68, which can be fixed to the periphery of rigid sections 58 and 60 and the helical spring 56 in a manner as shown by FIGURE 3. Cables 64–66 are fixed to the outer wall of rigid section 60 at 70–72 with approximately the same angular spacing of 120°.

Displacement of the flexible joint of FIGURE 3 is accomplished in a manner similar to that described for the flexible joint shown by FIGURE 2. It is contemplated that one or more flexible joints may form the necessary joints for a mechanical arm or other manipulative unit, and therefore additional cable arrangements may be required which would preferably extend through the flexible joint shown by FIGURE 3 in a manner similar to the cable arrangement 50 shown by FIGURE 2. However, the flexible joint can also be used singly in devices other than mechanical arms, for example, tool grapples, light positioning means, and the like.

Figure 4:
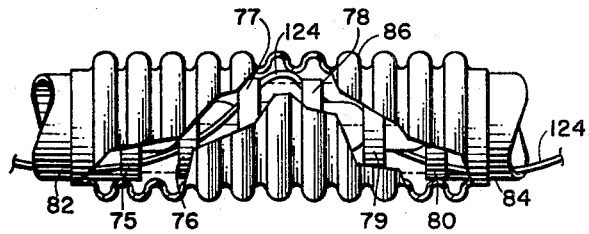
FIGURE 4 is a sectional view, partly broken away, of yet another form of flexible joint of the invention.
Figure 5:
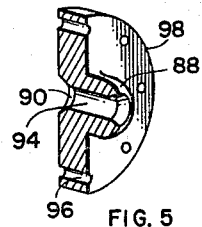
FIGURE 5 is a perspective view, partly sectional, of one form of segment having use in the joint of FIGURE 4.
Figure 6:
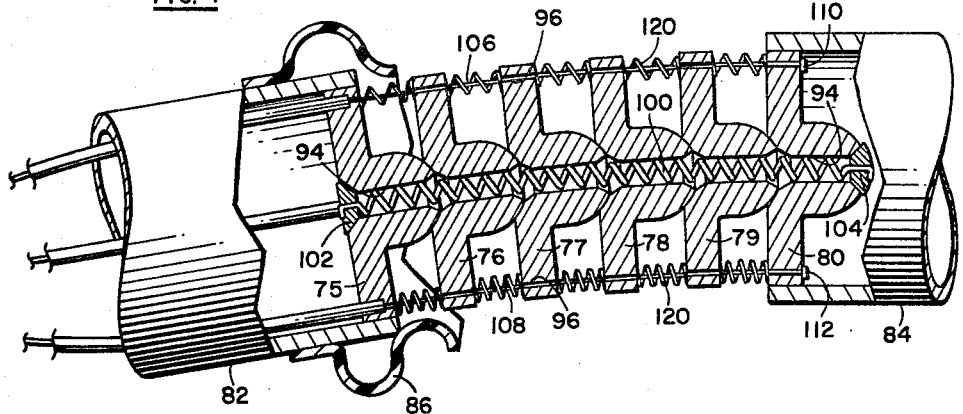
FIGURE 6 is an enlarged longitudinal sectional view, partly broken away, of the joint of FIGURE 4.

FIGURES 4–6 show yet another form of prestressed flexible joint that is formed in accordance with the invention. A plurality of axially aligned, interfitting segments or vertebra 75–80 are arranged in a prestressed manner between inflexible or rigid tube sections 82 and 84. A conventional flexible sheath or boot 86 may be attached as particularly shown by FIGURE 4 to exclude dirt, foreign objects, and the like from the joint.

The interfitting segments 75–80 are preferably similar in configuration and, as shown by FIGURE 5, each segment has a semispherical convex portion 88 and a complementary concave portion 90 on the obverse and reverse sides, respectively, of the segment. A central aperture 94 is formed in each segment, and a series of similar apertures, such as rim aperture 96, are circumferentially spaced adjacent to the rim 98 of the segment. Apertures 96 may be substantially parallel with the central aperture 94 or skewed therefrom as desired to more readily orient certain cable arrangements.

Referring now particularly to FIGURE 6, a tension spring 100 extends through the central apertures 94 of the segments 75–80 and is retained at each end by suitable thrust blocks 102 and 104 that cooperate with segments 75 and 80, respectively. It is contemplated that the thrust blocks or similar spring retaining means can be carried by the spaced-apart rigid tube sections 82 and 84 which are individually connected to segments 75 and 80, respectively. If desired, the tension of the spring 100 may be altered by providing a threadably adjustable thrust block.

The convex portions 88 of segments 75–79 are urged into sliding engagement with the complementary concave portions 90 of segments 76–80 by the tension spring 100. Displacement of the segments in any direction from a first or beginning position displaces the aligned segments 75–80 about the cooperating convex and concave portions 88 and 90. Surface irregularities of the respective convex and concave portions do not substantially hinder the sliding engagement of the complementing portions 88 and 90 since the tension spring 100 elongates to overcome such irregularities during displacement. If desired, alternate segments may be formed from a different material than the other segments.

Flexible operating cables, similar to those previously described with regard to FIGURES 2 and 3, extend through the central region of the rigid tube sections 82 and 84. Similar flexible cables, such as cables 106 and 108, extend axially from rigid tube section 82 and thread through the generally aligned rim apertures 96 in the interfitting segments 75–80. Those cables which are associated with the flexible joint, formed as shown by FIGURES 4–6, preferably extend through the rim apertures 96 and terminate at rigid tube section 84. The cable ends 110 and 112 of respective cables 106 and 108 are fixed to the region at or adjacent to the outer periphery of the tube section 84 as particularly shown by FIGURE 6.

Similar equalizing or balance springs, such as balance spring 120, are inserted in compression between the opposing faces of the interfitting segments 75–80. The flexible cables, such as cables 106 and 108, are threaded through the respective balance springs 120 associated with each cable. The compressive forces of the balance springs 120 cooperate with the tension spring 100, which may have a different spring characteristic, to prestress the flexible joint in a first position such as shown in FIGURE 4. Movement of any one of any combination of the flexible cables associated with a selected flexible joint, such as cables 106 and 108, displaces the prestressed joint from the first position. A partial displacement of the flexible joint is shown by FIGURE 6 where cable 108 has been shortened to displace the interfitting segments 75–80 and thus the rigid tube section 84.

It is contemplated that one or more flexible joints, similar to the joint shown by FIGURES 4–6, may form the required series of joints necessary for a mechanical arm or other articulated manipulative unit. The necessary cable arrangements for subsequent joints are preferably threaded through selected ones of the rim apertures 96 in a helical or skewed manner such as cable arrangement 124, more clearly shown by FIGURE 4. The generally helical arrangement of cable 124 about the flexible joint substantially eliminates displacement of a non-actuated joint by the necessary cable motion for an actuated joint.

It is further contemplated that the flexible prestressed joint as shown by FIGURES 4–6 may have individual segments, such as 75–80, which do not have convex and concave portions 88 and 90 respectively. Instead, the rigid segments can be threaded upon a centrally positioned prestressed tube, such as prestressed tube 30 shown by FIGURE 2, and individually spaced apart by suitable compression spring means or compressive resilient material, such as formed rubber, foamed plastic, and the like. The prestressed tube and compression means of such a flexible joint also serve to return the joint to a first or beginning position after a displacement, unless the joint is otherwise restrained.

As will be evidenced from the foregoing description, certain aspects of the invention are not limited to the particular details of contruction as illustrated, and it is contemplated that other modifications and applications will occur to those skilled in the art. While the several forms of flexible joints have been shown in first or beginning positions which are substantially straight, it is contemplated that each of the respective joints can also be oriented to a position that is other than straight. Deflection of the particular joint would still be accomplished in a manner similar to those previously described. It is further contemplated that any one of the several flexible joints as shown can be suitably formed and actuated to develop a joint that exhibits prehensile characteristics. It is, therefore, intended that the appended claims shall cover such modifications and applications that do not depart from the true spirit and scope of the invention.

Having described the invention, what I claim and desire to secure by Letters Patent of the United States is:

1. A flexible joint comprising:
   (a) at least one prestressed unit comprising:
      (1) at least one inner helically arranged channel-shaped flexible strip member, said inner channel-shaped member opening generally radially outwardly and having a compressive spring characteristic directed generally radially outwardly,
      (2) at least one outer helically arranged channel-shaped flexible strip member, said outer channel-shaped member opening generally radially inwardly and having a compressive spring characteristic directed generally radially inwardly,
      (3) said inner and outer channel-shaped strip members wound in interengaging opposition so that said cooperating strip members form said prestressed unit,
   (b) respective ones of at least one pair of rigid tubular members secured to and spaced apart by said prestressed unit, and
   (c) at least one actuator means extending through one of said rigid members to circumferentially spaced points about the periphery of the other of said rigid members,
   (d) said actuator means secured at said points so that controlled movement of said actuator means flexes said prestressed unit and displaces said prestressed unit and the other of said rigid members.

2. A flexible joint comprising:
   (a) a plurality of aligned interengaging segments,
   (b) a plurality of similar apertures in said segments,
   (c) at least one tension spring means associated with said segments urging said segments into interengagement,
   (d) a plurality of compression spring means positioned between adjacent ones of said segments and further positioned in alignment with respective ones of said apertures,
   (e) said tension and compression spring means prestressing said segments into a flexible prestressed unit,
   (f) respective ones of at least one pair of rigid tubular members connected to and spaced apart by said prestressed unit,
   (g) a first actuator means extending through one of said rigid members, through respective ones of said apertures and said compression spring means, and terminating at circumferentially spaced points about the periphery of the other of said rigid members, and
   (h) a second actuator means extending through one of said rigid members, helically about the periphery of said prestressed unit, and through the other of said rigid members,
   (i) said first actuator means connected at said circumferentially spaced points so that controlled movement of said first actuator means flexes said prestressed unit and displaces said unit and the other of said rigid members without movement of said second actuator means.

3. The flexible joint of claim 2 in which said second actuator means extends through respective ones of said apertures in said segments.

4. A flexible joint comprising:
   (a) a plurality of aligned interengaging segments,
   (b) each segment having an axially aligned, substantially semispherical, convex portion and complementary concave portion,
   (c) respective convex portions of said segments engaging associated concave portions of adjacent segments,
   (d) an axially aligned central aperture in each of said segments,
   (e) a plurality of circumferentially spaced apertures adjacent to the periphery of each segment,
   (f) at least one tension spring means positioned through said central apertures urging said convex and concave portions of said segments into interengagement,
   (g) a plurality of compression spring means positioned between adjacent ones of said segments and associated with respective ones of said circumferentially spaced apertures,
   (h) said tension and compression spring means prestressing said interengaging segments into a flexible prestressed unit,
   (i) respective ones of at least one pair of rigid tubular members secured to and spaced apart by said prestressed unit, and
   (j) a plurality of cables extending through one of said rigid members, through respective ones of said circumferentially spaced apertures in each segment and associated compression spring means therebetween, and terminating at circumferentially spaced points adjacent to the periphery of the other of said rigid members,
   (k) said cables secured at said points so that controlled movement of said cables flexes said prestressed unit and displaces said unit and the other of said rigid members.

References Cited by the Examiner

UNITED STATES PATENTS

| | | | |
|---|---|---|---|
| 1,989,960 | 2/1935 | Wheeler et al. | 3—12.3 XR |
| 2,043,566 | 6/1936 | Wikander | 267—61 |
| 2,416,817 | 3/1947 | Carter | 3—12.2 XR |
| 2,545,452 | 3/1951 | Fletcher | 3—12.7 |
| 2,759,765 | 8/1956 | Pawley | 285—223 XR |
| 3,000,197 | 9/1961 | Ruegg et al. | 267—1 |
| 3,060,972 | 10/1962 | Sheldon | 138—120 |
| 3,071,161 | 1/1963 | Ulrich | 285—114 XR |
| 3,162,214 | 12/1964 | Bazinet | 128—4 XR |

RICHARD A. GAUDET, *Primary Examiner.*

R. L. FRINKS, *Assistant Examiner.*